US012627177B2

(12) United States Patent
　　Tokaldani et al.

(10) Patent No.: US 12,627,177 B2
(45) Date of Patent: May 12, 2026

(54) TRANSMITTER COIL POWER FOREIGN OBJECT DETECTION

(71) Applicant: AIRA, INC., Chandler, AZ (US)

(72) Inventors: Mohammad Ali Saket Tokaldani, Vancouver (CA); Eric Heindel Goodchild, Phoenix, AZ (US)

(73) Assignee: Aira, Inc., Phoenix, AZ (US)

( * ) Notice: Subject to any disclaimer, the term of this patent is extended or adjusted under 35 U.S.C. 154(b) by 944 days.

(21) Appl. No.: 17/887,395

(22) Filed: Aug. 12, 2022

(65) Prior Publication Data

US 2023/0053186 A1　　Feb. 16, 2023

Related U.S. Application Data

(60) Provisional application No. 63/233,716, filed on Aug. 16, 2021.

(51) Int. Cl.
　　*H02J 50/00*　　(2016.01)
　　*H02J 50/12*　　(2016.01)
　　*H02J 50/40*　　(2016.01)
　　*H02J 50/60*　　(2016.01)

(52) U.S. Cl.
　　CPC ............ *H02J 50/60* (2016.02); *H02J 50/005* (2020.01); *H02J 50/12* (2016.02); *H02J 50/402* (2020.01)

(58) Field of Classification Search
　　USPC ......................... 320/106, 107, 108, 109, 110
　　See application file for complete search history.

(56) References Cited

U.S. PATENT DOCUMENTS

| | | |
|---|---|---|
| 2015/0285926 A1 | 10/2015 | Oettinger |
| 2017/0033591 A1 | 2/2017 | Govindaraj et al. |
| 2020/0259369 A1* | 8/2020 | Stingu ..................... H02J 50/50 |
| 2020/0290467 A1 | 9/2020 | Gao et al. |
| 2020/0328628 A1 | 10/2020 | Stingu et al. |
| 2020/0381960 A1 | 12/2020 | Goodchild et al. |

OTHER PUBLICATIONS

PCT/US2022/040365. International Search Report & Written Opinion mailed Nov. 3, 2022. (12 Pages).

* cited by examiner

*Primary Examiner* — Brian Ngo
(74) *Attorney, Agent, or Firm* — Anthony Smyth; Loza & Loza, LLP

(57)　　　ABSTRACT

Systems, methods and apparatus for wireless charging are disclosed. A wireless charging device has a resonant circuit including one or more power transmitting coils in a charging surface of the charging device, a driver circuit configured to provide a charging current to the resonant circuit, and a controller. The controller is configured to determine an average transmitted power using samples of current and voltage captured from the resonant circuit, and determine that a foreign object is located on or near the charging surface when the average transmitted power exceeds a measurement of received power provided by a receiving device and parasitic losses associated with the wireless charging device. In one example, each sample of current is obtained by measuring a current flowing in the resonant circuit, and each of sample of voltage is obtained by measuring a voltage across the one or more power transmitting coils.

13 Claims, 14 Drawing Sheets

202

202

202

202

202

200

Wireless Power Transfer With Foreign Object Present

*FIG. 6*

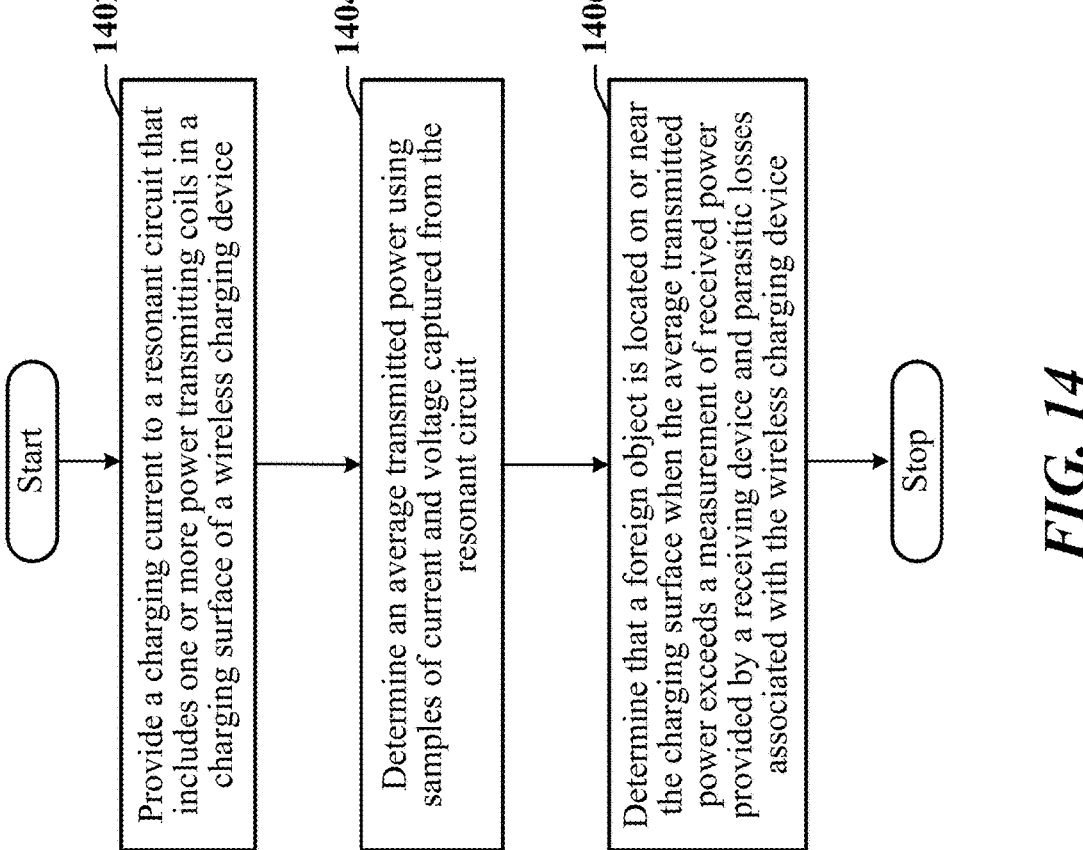

Start

1402

Provide a charging current to a resonant circuit that includes one or more power transmitting coils in a charging surface of a wireless charging device

1404

Determine an average transmitted power using samples of current and voltage captured from the resonant circuit

1406

Determine that a foreign object is located on or near the charging surface when the average transmitted power exceeds a measurement of received power provided by a receiving device and parasitic losses associated with the wireless charging device Stop

*FIG. 14*

1400

TRANSMITTER COIL POWER FOREIGN OBJECT DETECTION

PRIORITY CLAIM

This application claims priority to and the benefit of provisional patent application No. 63/233,716 filed in the United States Patent Office on Aug. 16, 2021 and the entire content of this provisional application is incorporated herein by reference as if fully set forth below in its entirety and for all applicable purposes.

TECHNICAL FIELD

The present invention relates generally to wireless charging of batteries, including batteries in mobile computing devices, and more particularly to detection of devices placed near a charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. For example, there is a need for a faster, lower power detection techniques that enable a charging device to detect and locate chargeable devices on a surface of a charging device and for improved techniques for thermal management.

BRIEF DESCRIPTION OF THE DRAWINGS

FIG. 6 illustrates a configuration of devices involved in a wireless power transfer when an interfering foreign object is present.

FIG. 14 illustrates a method for operating a charging device in accordance with certain aspects of this disclosure.

DETAILED DESCRIPTION

Figure 1:
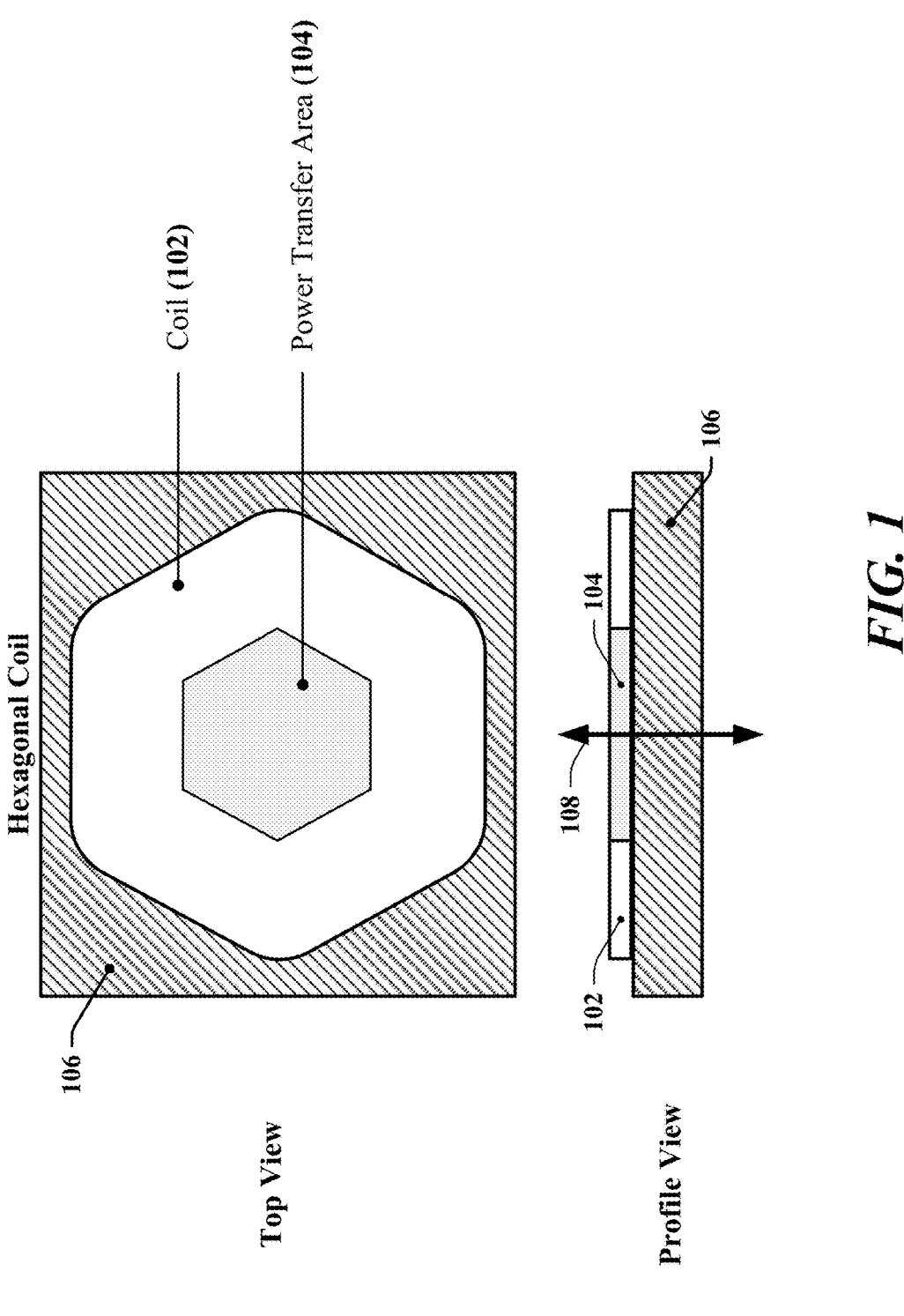
FIG. 1 illustrates an example of a charging cell that may be provided on a charging surface provided by a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods related to wireless charging devices that provide a free-positioning charging surface using multiple transmitting coils or that can concurrently charge multiple receiving devices. In one aspect, a controller in the wireless charging device can locate a device to be charged and can configure one or more transmitting coils optimally positioned to deliver power to the receiving device. Charging cells may be provisioned or configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing.

In one aspect of the disclosure, a method for operating a charging device includes transmitting an excitation flux from the charging device, the excitation flux being transmitted in a first range of frequencies that includes a first nominal resonant frequency associated with compatible chargeable devices, determining that a compatible chargeable device is available for charging by the charging device when resonance is detected in response to the excitation flux, and providing a charging current to a power transmitting coil of the charging device, the charging current being provided in a second range of frequencies that includes a second nominal resonant frequency associated with the compatible chargeable devices.

In some instances, the charging device may provide a charging surface whereby power can be wirelessly transferred to a receiving device located anywhere on the charging surface. Receiving devices can have an arbitrarily defined size and/or shape and may be placed without regard to any discrete placement locations enabled for charging. Multiple devices can be simultaneously or concurrently charged on a single surface. The apparatus can track motion of one or more devices across the surface.

Charging Cells

According to certain aspects disclosed herein, a charging device may be provided using charging cells that are deployed adjacent to a surface of the charging device. In one example the charging cells are deployed in accordance with a honeycomb packaging configuration. A charging cell may be implemented using one or more coils that can each induce a magnetic field along an axis that is substantially orthogonal to the surface of the charging device and adjacent to the coil. In this description, a charging cell may refer to an element having one or more coils where each coil is configured to produce an electromagnetic field that is additive with respect to the fields produced by other coils in the charging cell and directed along or proximate to a common axis.

In some implementations, a charging cell includes coils that are stacked along a common axis and/or that overlap such that they contribute to an induced magnetic field substantially orthogonal to the surface of the charging device. In some implementations, a charging cell includes coils that are arranged within a defined portion of the surface of the charging device and that contribute to an induced magnetic field within the substantially orthogonal portion of the surface of the charging device associated with the charging cell. In some implementations, charging cells may be configurable by providing an activating current to coils that are included in a dynamically-defined charging cell. For example, a charging device may include multiple stacks of coils deployed across a surface of the charging device, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface included in a charging system. The charging system may provide multiple charging surfaces. In some examples, the charging surfaces may be distributed throughout a room or within a passenger or other compartment of a vehicle.

In some examples provided in this disclosure, a charging surface may be understood to include an array of charging cells 100 provided on one or more substrates 106. A circuit having one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100.

In some examples, the charging cell 100 has a substantially hexagonal shape that encloses one or more coils 102, which may be constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
FIG. 2 illustrates an example of an arrangement of charging cells provided on a single layer of a segment of a charging surface provided by a wireless charging device in accordance with certain aspects disclosed herein.

FIG. 2 illustrates an example of an arrangement 200 of charging cells 202 provided on a single layer of a segment or portion of a charging surface that may be included in a charging system that has been adapted in accordance with certain aspects disclosed herein. The charging cells 202 are arranged according to a honeycomb packaging configuration. In this example, the charging cells 202 are arranged end-to-end without overlap. This arrangement can be provided without through-holes or wire interconnects. Other arrangements are possible, including arrangements in which some portion of the charging cells 202 overlap. For example, wires of two or more coils may be interleaved to some extent.

Figure 3:
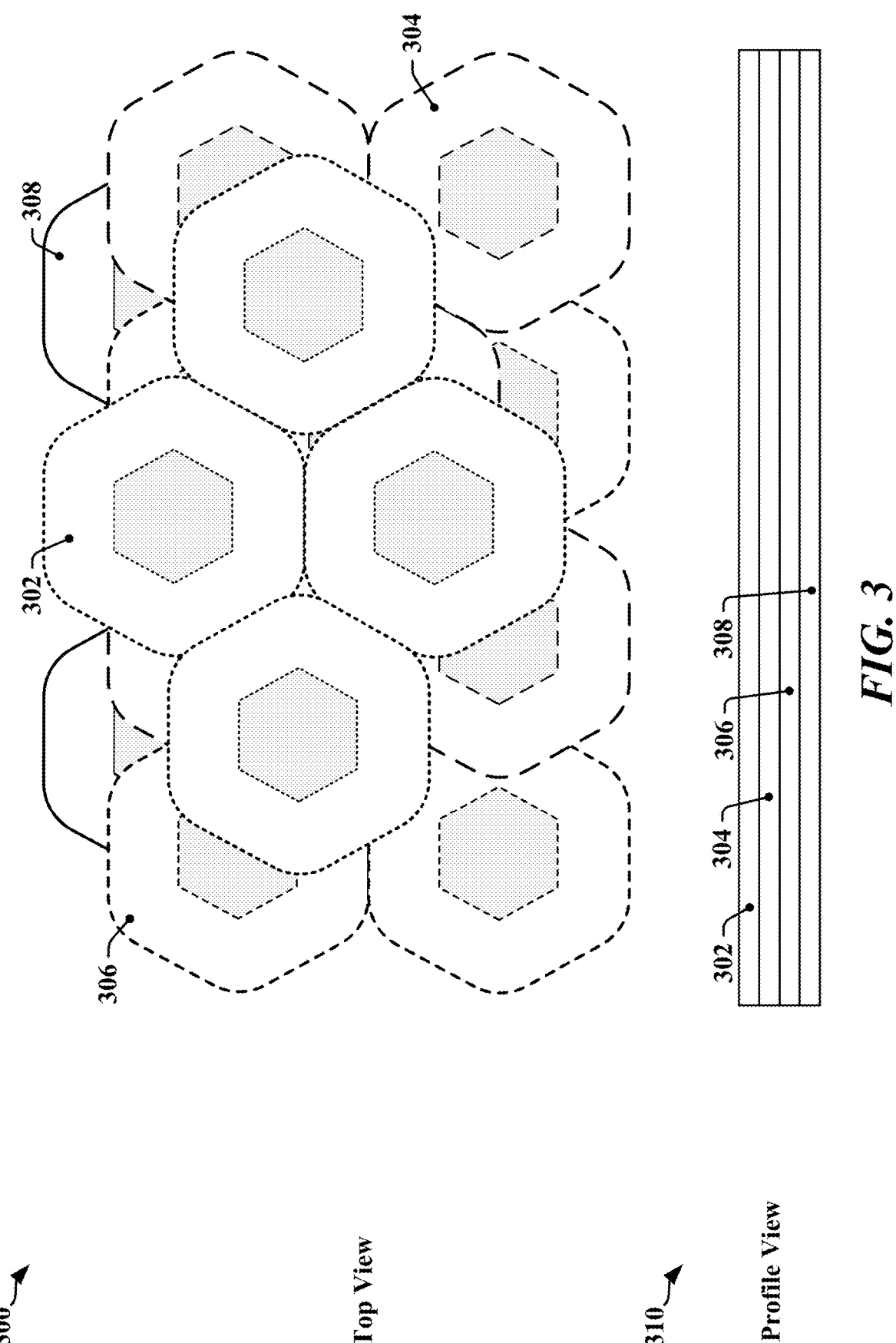
FIG. 3 illustrates an example of an arrangement of charging cells when multiple layers of charging cells are overlaid within a segment of a charging surface provided by a wireless charging device in accordance with certain aspects disclosed herein.

FIG. 3 illustrates an example of an arrangement of charging cells from two perspectives 300, 310 (e.g., top and profile views) when multiple layers are overlaid within a segment or portion of a charging surface that may be adapted in accordance with certain aspects disclosed herein. Layers of charging cells 302, 304, 306, 308 are provided within a segment of a charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment. The charging cells may be 302, 304, 306, 308 illustrated in FIG. 3 correspond to power transfer areas provided by transmitting coils that are polygonal in shape. In other implementations, the charging coils may comprise spirally-wound planar coils constructed from wires, each being wound to provide a substantially circular power transfer area. In the latter examples, multiple spirally-wound planar coils may be deployed in stacked planes below the charging surface of a wireless charging device.

Figure 4:
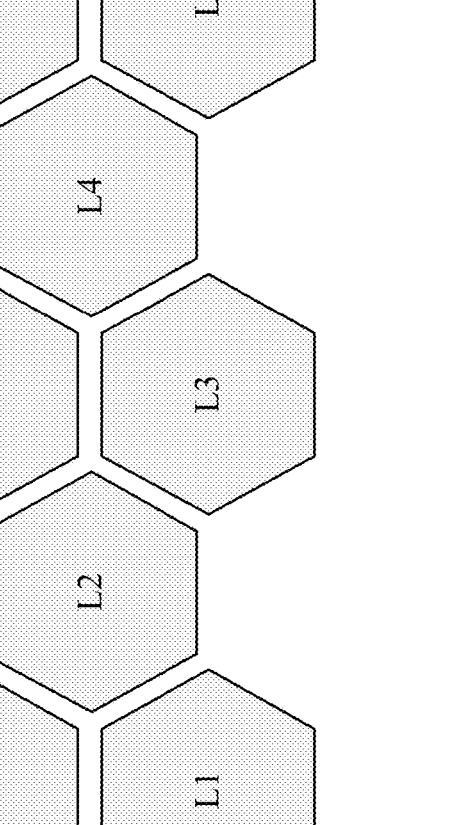
FIG. 4 illustrates the arrangement of power transfer areas provided by a charging surface of a charging device that employs multiple layers of charging cells configured in accordance with certain aspects disclosed herein.
Figure 4:
Figure 4:

FIG. 4 illustrates the arrangement of power transfer areas provided in a charging surface 400 provided by a charging system. In one example, the charging surface 400 employs multiple layers of charging cells configured in accordance with certain aspects disclosed herein. The illustrated charging surface 400 is constructed using four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
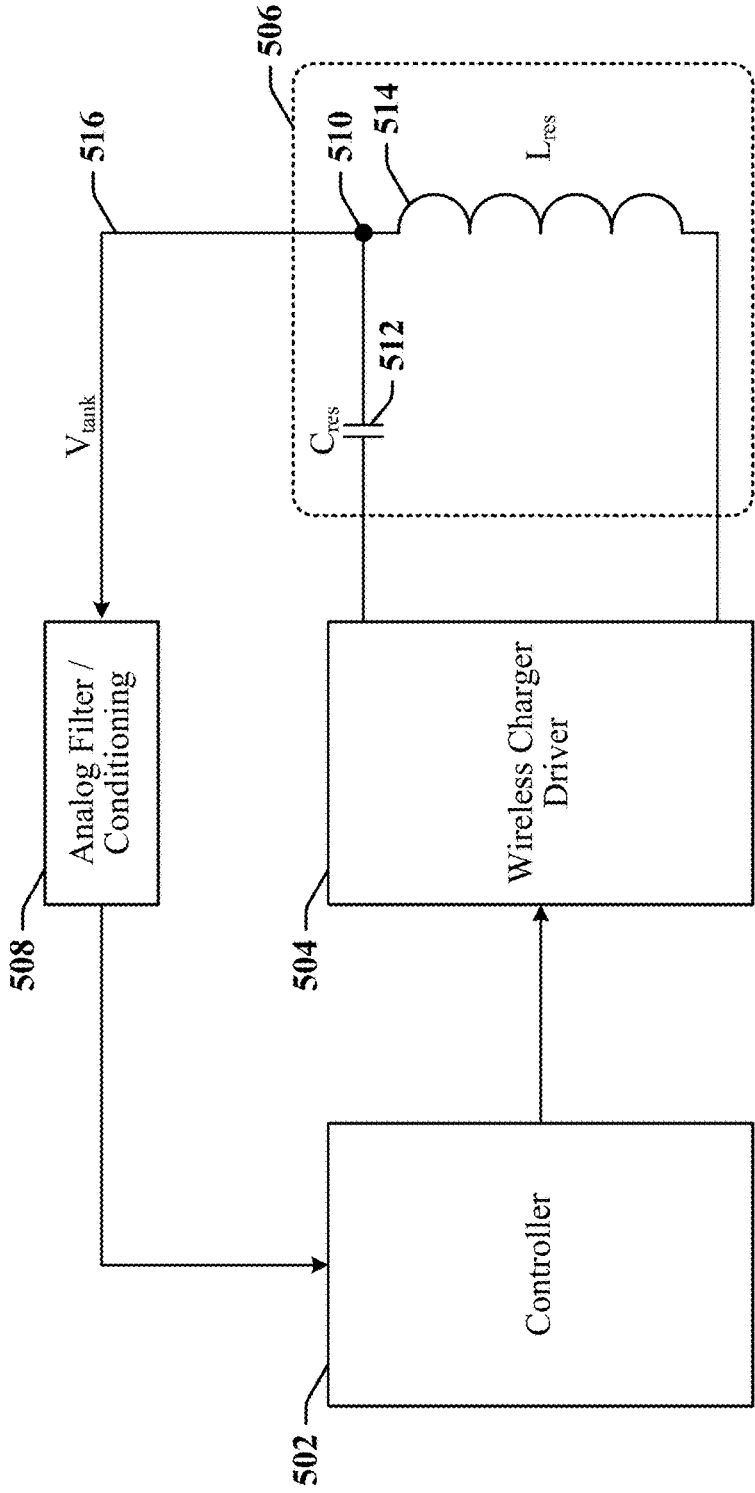
FIG. 5 illustrates a wireless power transmitter that may be provided in a charger base station in accordance with certain aspects disclosed herein.

FIG. 5 illustrates a wireless transmitter 500 that may be provided in a charger base station. A controller 502 may receive a feedback signal filtered or otherwise processed by a conditioning circuit 508. The controller may control the operation of a driver circuit 504 that provides an alternating current (AC) signal to a resonant circuit 506 that includes a capacitor 512 and inductor 514. The resonant circuit 506 may also be referred to herein as a tank circuit, an LC tank circuit and/or as an LC tank, and the voltage 516 measured at an LC node 510 of the resonant circuit 506 may be referred to as the tank voltage.

The wireless transmitter 500 may be used by a charging device to determine if a compatible device has been placed on a surface of the charging device. For example, the charging device may determine that a compatible device has been placed on the surface of the charging device by sending an intermittent test signal (active ping) through the wireless transmitter 500, where the resonant circuit 506 may detect or receive encoded signals when a compatible device responds to the test signal. The charging device may be configured to activate one or more coils in at least one charging cell after receiving a response signal defined by standard, convention, manufacturer or application. In some examples, the compatible device can respond to a ping by communicating received signal strength such that the charging device can find an optimal charging cell to be used for charging the compatible device.

Passive device discovery techniques, including certain techniques disclosed herein, can determine that a chargeable device has been placed on the charging surface using test signals that do not require an active response from the chargeable device. A passive device discovery technique may involve transmission of a pulse through the surface of the charging device in order to stimulate a response that is indicative of the presence or absence of a chargeable device. In one example, a passive ping may monitor the voltage and/or current measured or observed at the LC node 510 within the charging device to identify the presence of a receiving coil in proximity to the charging pad of a device adapted in accordance with certain aspects disclosed herein. In many conventional wireless charger transmitters, circuits are provided to measure voltage at the LC node 510 or to measure the current in the LC network. These voltages and currents may be monitored for power regulation purposes or to support communication between devices. In the example illustrated in FIG. 5, voltage at the LC node 510 is monitored, although it is contemplated that current may additionally or alternatively be monitored to support passive ping in which a short pulse is provided to the resonant circuit 506. A response of the resonant circuit 506 to a passive ping (initial voltage $V_0$) may be represented by the voltage ($V_{LC}$) at the LC node 510, such that:

$$V_{LC} = V_0 e^{-\left(\frac{\omega}{2Q}\right)t}. \tag{Eq. 1}$$

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, the optimal charging configuration may be selected at the charging cell level. In other instances, charging cells may be defined based on placement of a device to be charged on a surface of the charging device. In these other instances, the combination of coils activated for each charging event can vary. In some implementations, a charging device may include a driver circuit that can select one or more cells and/or one or more predefined charging cells for activation during a charging event.

Certain aspects of this disclosure measure or monitor characteristics of a wireless power transmitter to detect the presence or absence of a foreign object that is affecting the efficiency of wireless power transfer.

Under ideal operating conditions, the magnetic flux generated during wireless power transfer is limited to the transmitter and receiver coils. However, it is common that metallic or magnetically permeable objects such as coins, keys, screws and wires be located such that they are exposed to the magnetic field generated during wireless power transfer. An object may be considered to be magnetically permeable when it tends to become magnetized when exposed to a magnetic field. The object becomes magnetized, for example, when an internal magnetic field is formed within the objects in response to an applied magnetic field. Magnetic permeability of a material describes or quantifies the response of the material to the applied magnetic field. In this description, the terms "magnetically permeable" and "magnetic" are interchangeable when used, for example, to describe an object material or component.

A changing magnetic field can induce eddy current in metallic or magnetically permeable objects and the energy of the eddy currents may be converted to thermal energy. A substantial percentage of the power losses incurred in wireless power transfer may be caused by eddy currents that can result in heating of the wireless charging device or the device being charged. Even a few hundred mW of power loss can cause large temperature increases in the metallic or magnetically permeable objects and can lead to serious safety issues.

According to certain aspects of this disclosure, the transmitter in wireless power transfer can be configured to detect whether any foreign object is located within an active charging area on the surface of a wires charging device and/or within the range of magnetic fields developed within the active charging area, and may be further configured to mitigate temperature buildup caused by the presence of these objects.

Temperature buildup may result from the flow of eddy currents induced in an interfering foreign object or internal component of the wireless charging device or the device being charged. For the purposes of this disclosure, an interfering foreign object can include any metallic or magnetically permeable object that is located within the magnetic flux produced during wireless power transfer. An internal component of the wireless charging device or the device being charged includes any metallic or magnetically permeable objects of the wireless charging device or the device being charged that receive or respond to a portion of the magnetic flux produced during wireless power transfer.

Figure 6:
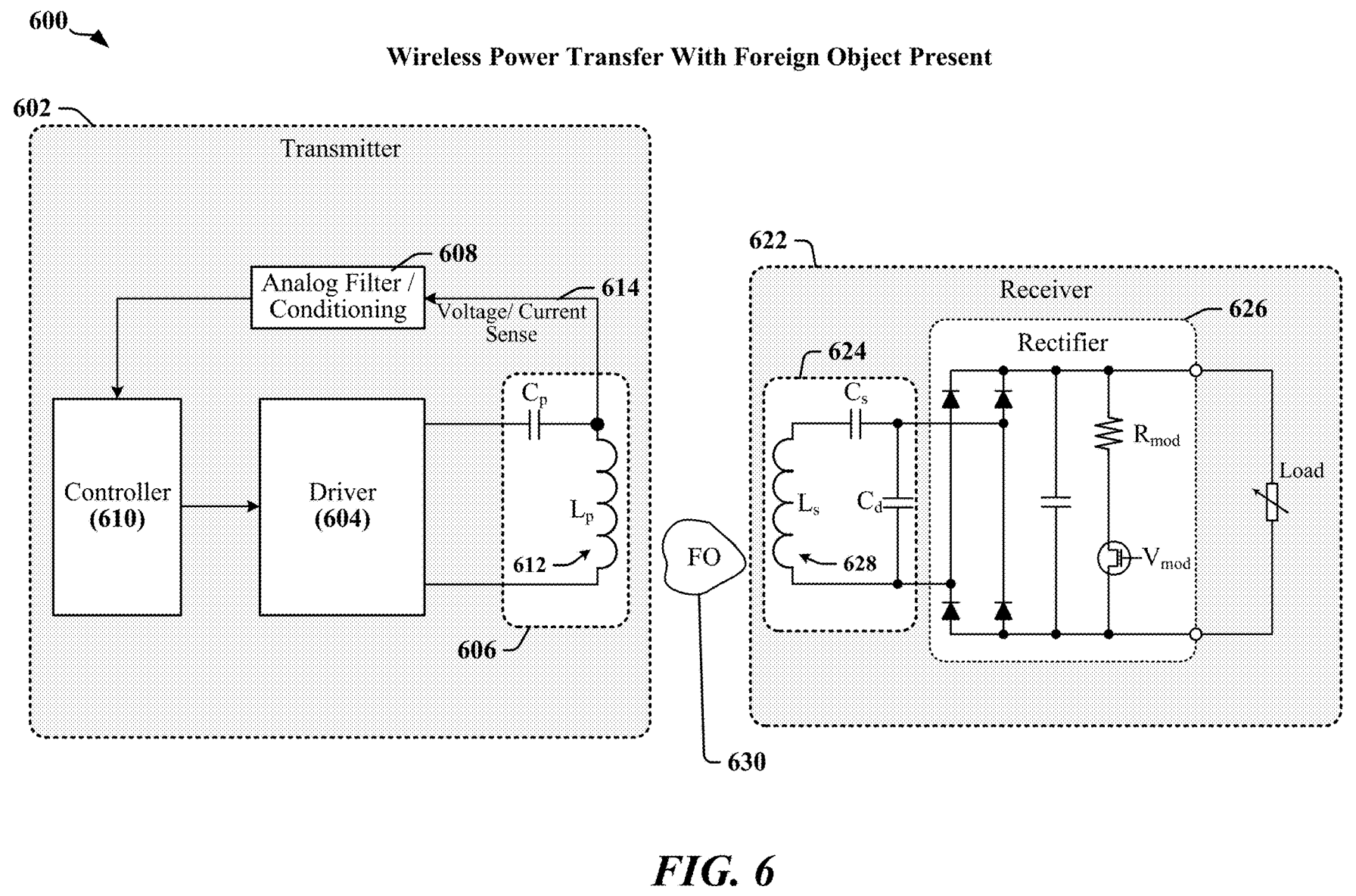

FIG. 6 illustrates a configuration of devices 600 involved in wireless power transfer when an interfering foreign object 630 is present. A wireless power transmitter 602 includes a driver circuit 604 that generates a charging current to drive a resonant circuit 606. The resonant circuit 606 may be represented as an LC tank circuit including a capacitor ($C_p$) and an inductor 612 ($L_p$). The charging current may be substantially the same as the current in the inductor 612. A controller 610 may be operated to control the transmitted power by monitoring a measurement signal 614 representative of voltage across the inductor 612 and/or charging current through the inductor 612. In one example, the measurement signal 614 may be filtered or otherwise conditioned by a conditioning circuit 608 to configure responsiveness of the controller 610 to changes in the measured quantities and to enable the controller 610 to ignore short-lived transients.

The receiver 622 may be incorporated in a mobile device such as a wireless communication device, headset, etc. The receiver 622 includes a resonant circuit 624 that can be tuned to the frequency or expected frequency of the magnetic flux generated by the wireless power transmitter 602. A rectifier circuit 626 rectifies an induced current from the resonant circuit 624 to provide direct current (DC) power to a load. The magnetic flux generated by the wireless power transmitter 602 during wireless power transfer is generally not limited to the flux coupling the transmitting coils represented by the inductor 612 in the transmitter and to the receiving coils that are represented by the inductor 628 in the resonant circuit 624 of the receiver 622. In the illustrated example, a foreign object 630 is partially located between the transmitting coils and the receiving coils such that a portion of the magnetic flux generated by the wireless power transmitter 602 during wireless power transfer passes through the foreign object 630.

Figure 7:
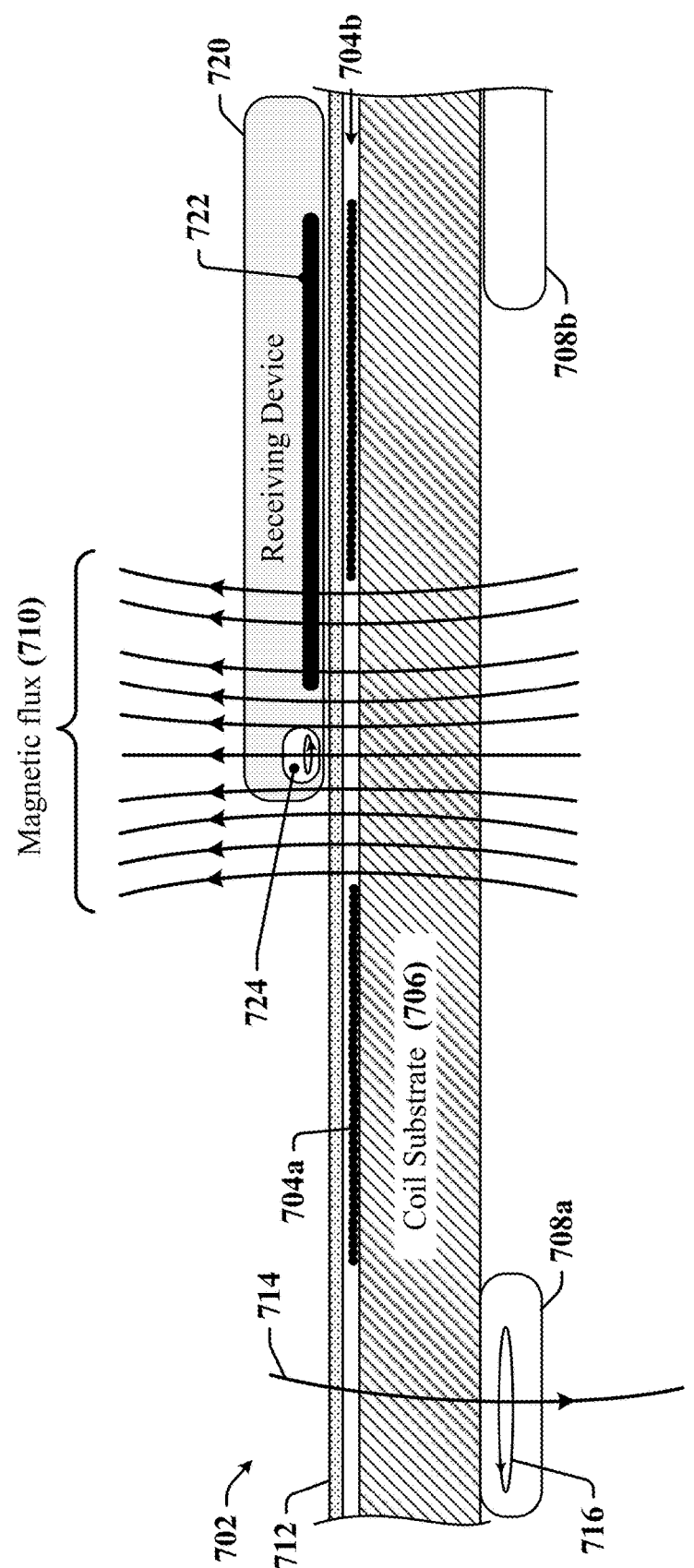
FIG. 7 provides an example of a cross-sectional view illustrating a portion of a wireless power transmitter and a wireless power receiver during a wireless power transfer.

FIG. 7 provides a cross-sectional view 700 illustrating a portion of a wireless power transmitter 702 and a wireless power receiver 720 during wireless power transfer. The cross-sectional view 700 shows a cross-section of a single planar wire-wound transmitting coil 704a, 704b provided on a substrate 706 and just below a charging surface 712 of the wireless power transmitter 702. The wireless power transmitter 702 may be a multicoil device capable of charging multiple devices concurrently. In one example, other transmitting coils may be supported by the substrate 706 or embedded in the substrate 706 and positioned such that they do not intersect the plane of the cross-sectional view 700. In the illustrated example, two internal components 708a, 708b are located below the substrate 706. The internal components 708a, 708b may be fabricated using a metallic or magnetically permeable material. In one example, the internal components 708a, 708b may include fasteners or washers. In another example, the internal components 708a, 708b may include wire conduits that provide electromagnetic shielding for an inner chamber.

The wireless power receiver 720 is located on top of the charging surface 712 and may be supported by the upper surface of the charging surface 712. The wireless power receiver 720 has a receiving coil 722 that is at least partially aligned with the transmitting coil 704a, 704b provided by the wireless power transmitter 702 such that at least some of a magnetic flux 710 generated by the transmitting coil 704a, 704b of the wireless power transmitter 702 passes through windings of the receiving coil 722 during wireless power transfer. A portion of the magnetic flux 710 also passes through an internal component 724 of the wireless power receiver 720. The internal component 724 may be fabricated using a metallic or magnetically permeable material. In some examples, the internal component 724 may include a fastener or a portion of a frame or other internal structure of the wireless power receiver 720.

In the illustrated example, a return portion 714 of the magnetic flux 710 passes through an internal component 708a of the wireless power transmitter 702 generating an eddy current 716. This eddy current 716 and an eddy current induced in the internal component 724 of the wireless power receiver 720 may cause a loss of transmitted power, and the lost transmitted power may be dissipated as heat energy. The heat energy may affect the operability of the wireless power transmitter 702 or the wireless power receiver 720. For example, detected increases in temperature may cause the wireless power transmitter 702 to reduce the level of power transmission and may consequently increase the time required to fully charge the wireless power receiver 720.

According to certain aspects of this disclosure, a wireless power transmitter 702 may prevent or limit temperature increase by detecting transmission power loss or inefficiency and by reducing power transfer rates before temperatures rise sufficiently to require protocol-specified temperature management procedures.

Various standards and protocols provide that a receiving device is expected or required to report levels of power received during wireless power transfer. Power level may be reported in information encoded in modulations of the magnetic flux transmitted from the charging device. The receiving device may cause modulation of this magnetic flux by switching the level of impedance presented by its power receiving circuit. Periodic reports of power received can be used by a power transmitting device to determine the efficiency of the power transmission and the level of losses incurred during wireless power transfer. The power transmitting device may use these determinations to mitigate power losses. In one example, the power transmitting device may attempt to improve electromagnetic coupling between the power transmitting device and the receiving device by changing frequency of the charging current provided to one or more power transmitting coils. In another example, a multi-coil power transmitting device may generate a different charging configuration by adding or dropping certain transmitting coils from the charging configuration to improve the electromagnetic coupling between the power transmitting device and the receiving device or reduce parasitic couplings.

A power transmitting device may also determine that a foreign object is present using reports of received power provided by the receiving device. In the ideal case power ($P_{rx}$) reported by the receiving device is equal to the power ($P_{tx}$) transmitted by the transmitting device. That is:

$$P_{tx} = P_{rx}. \qquad \text{Equation 1}$$

A foreign object that encounters a portion of magnetic flux also receives power ($P_{FO}$) from the transmitting device. The transmitting device may conclude that a foreign object is present when:

$$P_{tx} = P_{rx} + P_{FO} > P_{rx}. \qquad \text{Equation 2}$$

In practical applications, perfect transfer of power is unlikely and $P_{tx}$ is expected to always exceed $P_{rx}$ due to imperfect coupling and other parasitic effects arising from the physical design and configuration of the transmitting device and receiving device.

A wireless charging device configured in accordance with certain aspects of this disclosure can measure transmitted power and parasitic losses with some accuracy, enabling the wireless charging device to detect arrival, presence and departure of a foreign object with respect to the wireless charging device. The wireless charging device may determine the distribution of transmitted power as follows:

$$P_{tx} = 1/T_{sw} \int (V_{Coil} \times I_{Coil}) dt - \text{Loss}_{Coil} - \text{Loss}_{Int}. \qquad \text{Equation 3}$$

where:
$V_{coil}$ is the voltage measured across the transmission coil or transmission coils, $I_{coil}$ is the current flowing in the transmission coil or transmission coils, $1/T_{sw}$ is the switching frequency, $\text{Loss}_{Coil}$ includes losses due to coil resistance and coil ferrite, and $\text{Loss}_{Int}$ represents losses due to eddy currents induced in metallic or magnetically permeable parts of the transmitting device by magnetic flux during wireless power transfer.

The transmitted power in Equation 3 is calculated as the average of the product of $V_{coil}$ and $I_{coil}$. According to one aspect of the disclosure, the continuous integration term in Equation 3 can be rewritten using discrete terms and derived using samples of voltage and current in accordance with the equation:

$$P_{tx} = 1/N_{Samp} \sum_{n=1}^{n=N_{Samp}} (V(n)_{Coil} \times I(n)_{Coil}) - \text{Loss}_{Coil} - \text{Loss}_{int}. \qquad \text{Equation 4}$$

where:
$V(n)_{Coil}$ represents the nth sample of voltage measured across the transmission coil or transmission coils, $I(n)_{Coil}$ represents the nth sample of current measured through the resonant circuit, the transmission coil or transmission coils, and $N_{samp}$ represents the number of samples.

The accuracy of the average power $P_{tx}$ calculated using Equation 4 relies on the availability of an adequate number ($N_{samp}$) of evenly distributed sampling points in a cycle of the charging current or magnetic flux, and further assumes that each pair of samples ($V(n)_{Coil}$ and $I(n)_{Coil}$) are captured simultaneously.

Figure 8:
FIG. 8 illustrates a first example of a wireless charging device configured to sample voltage and current in a resonant circuit according to certain aspects of this disclosure.

FIG. 8 illustrates an example of a wireless charging device 800 configured to sample $V_{Coil}$ 824 and $I_{Coil}$ 826 in accordance with certain aspects of this disclosure. A processing circuit 802 may include a microprocessor, micro-controller, DSP, finite state machine, or other type of controller, referred to herein as the processor 810. In the illustrated example, the processing circuit 802 includes a pair of analog-to-digital converters (ADC 814 and ADC 816) and a clock generation circuit 812. The clock generation circuit 812 provides the ADCs 814, 816 with a sampling clock signal 818 used to control timing of sampling of $V_{Coil}$ 824 and $I_{Coil}$ 826 in accordance with certain aspects of this disclosure. The ADCs 814, 816 and the clock generation circuit 812 may be configured and/or controlled by the processor 810. In some instances, the ADCs 814, 816 and the clock generation circuit 812 may be implemented within or by the processor 810. In some instances, the ADCs 814, 816 and the clock generation circuit 812 may be externally provided with respect to the processing circuit 802.

The clock generation circuit 812 may be used to generate a power transfer clock signal 828 used to control the frequency of a switching circuit. The switching circuit may be included in a driver circuit 806 that provides a charging current to resonant circuit 804 that includes one or more wireless power transmitting coils 822. The switching circuit may be used to convert DC power to obtain an AC charging current at a frequency controlled by the power transfer clock signal 828. In some instances, the power transfer clock signal 828 is generated by a clock generation circuit other than clock generation circuit 812.

The processor 810 may additionally configure or control the operation of the driver circuit 806 that provides power to a resonant circuit 804. The resonant circuit 804 may be configured based on the charging configuration and the number of power transmitting coils 822. $V_{Coil}$ 824 may be monitored at a node 820 in the resonant circuit 804, and $I_{Coil}$ 826 may be monitored using a current sensing circuit. In one example, the current sensing circuit may include a low-value resistor to produce a small voltage drop representative of the current flow through the resistor. $V_{Coil}$ 824 is provided to a first ADC 814 and $I_{Coil}$ 826 is provided to a second ADC 816. In the illustrated example, the ADCs 814, 816 are clocked by the same sampling clock signal 818 to ensure simultaneous sampling of $V_{Coil}$ 824 and $I_{Coil}$ 826 in accordance with certain aspects of this disclosure.

The limited sampling speed of devices used to implement the ADCs 814, 816 may limit the accuracy of the average power $P_{tx}$ calculated using Equation 4. Conventional ADCs may be able to capture a relatively small number of samples per switching cycle of the $V_{Coil}$ 824 or $I_{Coil}$ 826. In one example, the $V_{Coil}$ 824 and $I_{Coil}$ 826 are derived using a switching circuit that switches with a period of 10 μS and the ADCs 814, 816 may be configured to sample at a 1 MHz frequency resulting in 10 samples per cycle of the waveform of the $V_{Coil}$ 824 and $I_{Coil}$ 826. This number of samples per cycle may be inadequate for detecting the presence or removal of foreign objects.

According to one aspect of this disclosure, average power $P_{tx}$ may be calculated with improved accuracy when Equation 4 is fed with samples captured over several switching cycles. In steady-state conditions, the waveforms are reliably repetitive and sampling can be performed at the rate dictated by the ADCs 814, 816 until sufficient samples are collected to ensure an accurate determination of average power $P_{tx}$. Samples are captured at a fixed rate to ensure even distribution of sample points throughout the cycles of the waveform sampled.

The distribution of sample points may be configured using a sampling clock signal 818 and a power transfer clock signal 828 that are synchronized. In some examples, the frequency of the sampling clock signal 818 may be an integer multiple of frequency of the power transfer clock signal 828. In some examples, both the sampling clock signal 818 and the power transfer clock signal 828 may be generated from a higher-frequency common root clock signal. In the latter examples, the processor 810 may select divider values used to generate the respective clock signals 818, 828 from the common root clock signal. In some instances, the divider values may be selected to obtain a desired relationship between the frequencies of the sampling clock signal 818 and the power transfer clock signal 828. Other circuits may be used to fix a relationship between the sampling clock signal 818 and the power transfer clock signal 828. In various examples, delay-locked loop, injection-locked oscillators and other oscillator circuits may be used to generate one or both clock signals 818, 828.

In certain examples, evenly distributed samples may be obtained using a sampling frequency ($f_s$) that may be calculated as:

$$f_s = f_{sw} \times N_{samp}/N_{cycles} \qquad \text{Equation 5}$$

where:

$f_{sw}$ is the switching frequency (power transfer clock signal 828), $N_{Samp}$ is the number of samples per calculation, and $N_{Cycles}$ is the number of Cycles during which samples are captured.

Figure 9:
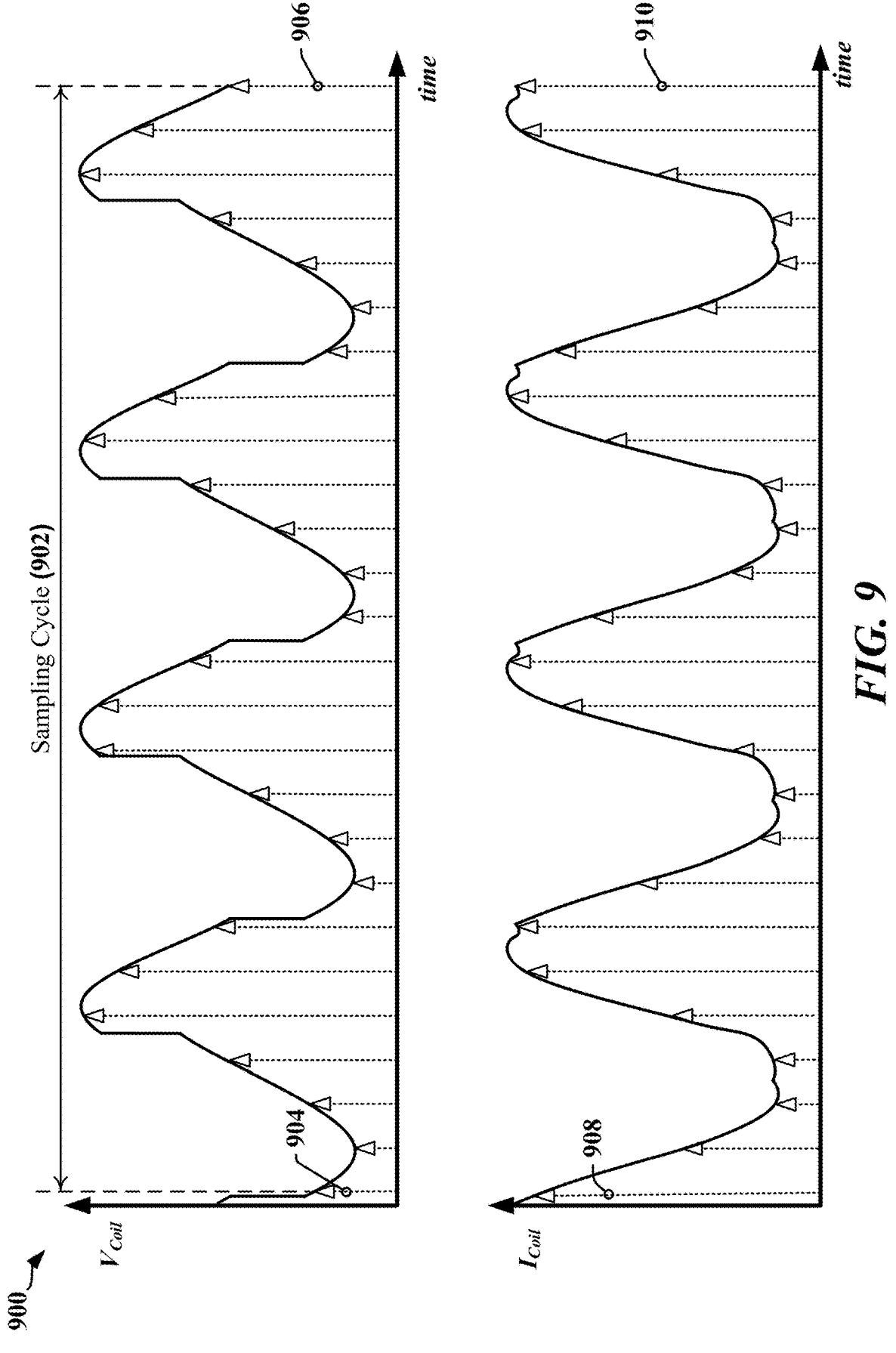
FIG. 9 illustrates an example of a sampling scheme configured in accordance with certain aspects of this disclosure.

In Equation 5, $N_{Samp}$ and $N_{Cycles}$ are integer numbers with a greatest common divisor of 1. In the example of a sampling scheme 900, illustrated in FIG. 9, a sampling period (sampling cycle 902) includes 25 intervals commencing with a first sample point 904 for $V_{Coil}$ 824 and a first sample point 908 for $I_{Coil}$ 826, with the samples being evenly distributed. The first sample points 906, 910 for the following sample slot are also shown. In the example illustrated in FIG. 9, the 25 samples are spread over 4 cycles of voltage and current. In the illustrated example, samples of $V_{Coil}$ 824 and $I_{Coil}$ 826 are captured simultaneously.

Figure 10:
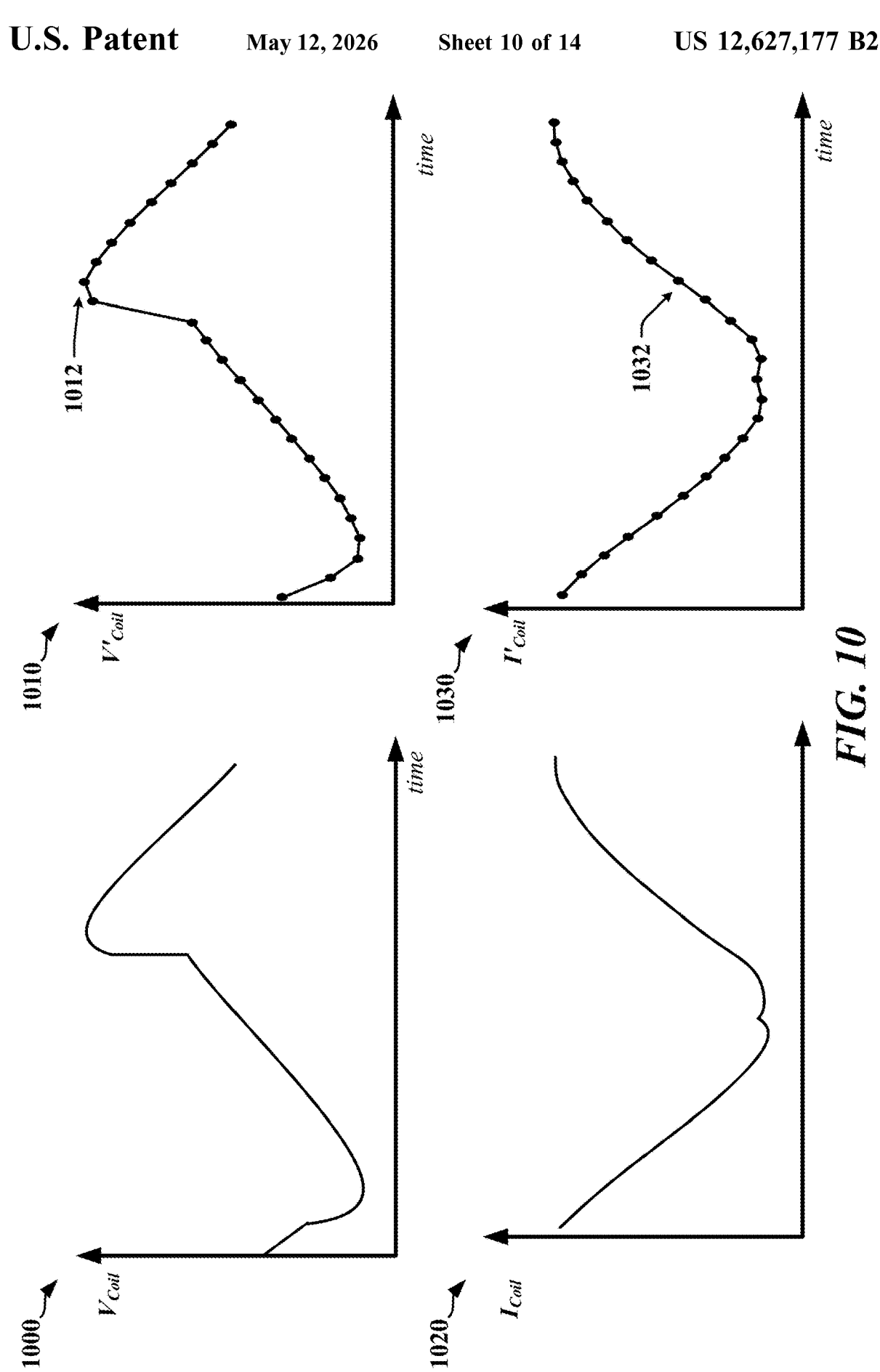
FIG. 10 illustrates an example of signal reconstruction from voltage and current values sampled in accordance with certain aspects of this disclosure.

FIG. 10 illustrates an example of signal reconstruction from sampled values in accordance with certain aspects of this disclosure. The sampling scheme 900 illustrated in FIG. 9 may be used to obtain samples from 4 cycles of the $V_{Coil}$ waveform 1000 and the $I_{Coil}$ waveform 1020. A reconstructed $V'_{Coil}$ waveform 1010 and a reconstructed $I'_{Coil}$ waveform 1030 are obtained by superimposing samples captured from the four cycles. In one example, a sample 1012 of voltage and a corresponding sample 1032 of current may be used to determine or estimate instantaneous power at a sample point in the 4-cycle sampling cycle. The sample point may be located by reference to time offset or by phase of the $V_{Coil}$ waveform 1000 or the $I_{Coil}$ waveform 1020.

In accordance with certain aspects of the disclosure, a single ADC can be used for sampling and digitizing measurements of both voltage and current waveforms. A single ADC may be provided in some processing circuits, processors, digital signal processors or other controllers that could be otherwise suitable for use in a wireless charging device. In steady-state conditions, the voltage and current waveforms are typically reliably repetitive and sampling of voltage and current can be performed over multiple sampling cycles 902 (see FIG. 9). In one example, four cycles of the voltage waveform or current waveform may yield the desired 25 samples using an ADC configured to sample at a 1 MHz frequency. Two sampling cycles 902 provide a total of 50 sampling opportunities that can be allocated evenly to obtain 25 samples of the voltage waveform and 25 samples of the current waveform.

Figure 11:
FIG. 11 illustrates a second example of a wireless charging device configured to sample voltage and current in a resonant circuit according to certain aspects of this disclosure.

FIG. 11 illustrates an example of a wireless charging device 1100 configured to sample $V_{Coil}$ 1124 and $I_{Coil}$ 1126 using one ADC 1114 in accordance with certain aspects of this disclosure. A processing circuit 1102 may include a microprocessor, microcontroller, DSP, finite state machine, or other type of controller, referred to herein as the processor 1110. In the illustrated example, the processing circuit 1102 or processor 1110 includes a clock generation circuit 1112, the ADC 1114, and a switch 1116. In the illustrated example, the clock generation circuit 1112 provides the ADC 1114 with a sampling clock signal 1118 and provides the switch 1116 with a selection signal 1130. The selection signal 1130 selects between $V_{Coil}$ 1124 and $I_{Coil}$ 1126 to provide an input to the ADC 1114 for capture and digitization. In one example, the selection signal 1130 causes the switch 1116 to provide $V_{Coil}$ 1124 and $I_{Coil}$ 1126 in alternating sample intervals. In one example, $V_{Coil}$ 1124 is sampled at each sampling point in one of two sampling slots (see sampling cycle 902 in FIG. 9) and $I_{Coil}$ 1126 is sampled at each sampling point in the second of two sampling cycles 902. In another example, interleaved sampling is employed whereby $V_{Coil}$ 1124 is sampled at the odd sampling points (1-25) in a first of two sampling slots and at the even sampling points (2-24) in a second of two sampling slots, while $I_{Coil}$ 1126 is sampled at the even sampling points (2-24) in the first of two sampling slots and at the odd sampling points (1-25) in the second of two sampling slots. Other sampling schemes may be used, and may be selected for use based on stability of the steady state condition, for example.

The clock generation circuit 1112, ADC 1114 and switch 1116 may be configured and/or controlled by the processor 1110. In some instances, the clock generation circuit 1112, ADC 1114 and switch 1116 may be implemented within or by the processor 1110. In some instances, the clock generation circuit 1112, ADC 1114 and switch 1116 may be externally provided with respect to the processor 1110 or the processing circuit 1102.

The clock generation circuit 1112 may be used to generate a power transfer clock signal 1128 used to control the frequency of a switching circuit in the driver. The switching circuit may be included in a driver circuit 1106 that provides a charging current to resonant circuit 1104 that includes one or more wireless power transmitting coils 1122. The switching circuit may be used to convert DC power to obtain an AC charging current at a frequency controlled by the power transfer clock signal 1128. In some instances, the power transfer clock signal 1128 is generated by a different clock generation circuit.

The processor 1110 may additionally configure or control the operation of the driver circuit 1106 that provides power to a resonant circuit 1104. The resonant circuit 804 may be configured based on the charging configuration and the number of power transmitting coils 1122. $V_{Coil}$ 1124 may be monitored at a node 1120 in the resonant circuit 1104, and $I_{Coil}$ 1126 may be monitored using a current sensing circuit. In one simple example, the current sensing circuit may include a low-value resistor to produce a small voltage drop representative of the current flow through the resistor.

According to one aspect of this disclosure, average power $P_{tx}$ may be calculated using equation 4 with accuracy using samples captured over several switching cycles. In steady-state conditions, the waveforms are reliably repetitive and sampling can be performed at the rate dictated by the ADC 1114 until sufficient samples are obtained to ensure an accurate determination of average power $P_{tx}$. Samples are captured at a fixed rate to ensure even distribution of sample points throughout the cycles of the waveform sampled.

The distribution of sample points may be configured using a sampling clock signal 1118 and a power transfer clock signal 1128 that are synchronized. In some examples, the frequency of the sampling clock signal 1118 may be an integer multiple of frequency of the power transfer clock signal 1128. In some examples, both the sampling clock signal 1118 and the power transfer clock signal 1128 may be generated from a higher-frequency common root clock signal. In the latter examples, the processor 1110 may select divider values used to generate the respective clock signals 1118, 1128 from the common root clock signal. In some instances, the divider values may be selected to obtain a desired relationship between the frequencies of the sampling clock signal 1118 and the power transfer clock signal 1128. Other circuits may be used to fix a relationship between the sampling clock signal 1118 and the power transfer clock signal 1128. In various examples, delay-locked loops, injection-locked oscillators and other oscillator circuits may be used to generate one or both clock signals 1118, 1128.

Figure 12:
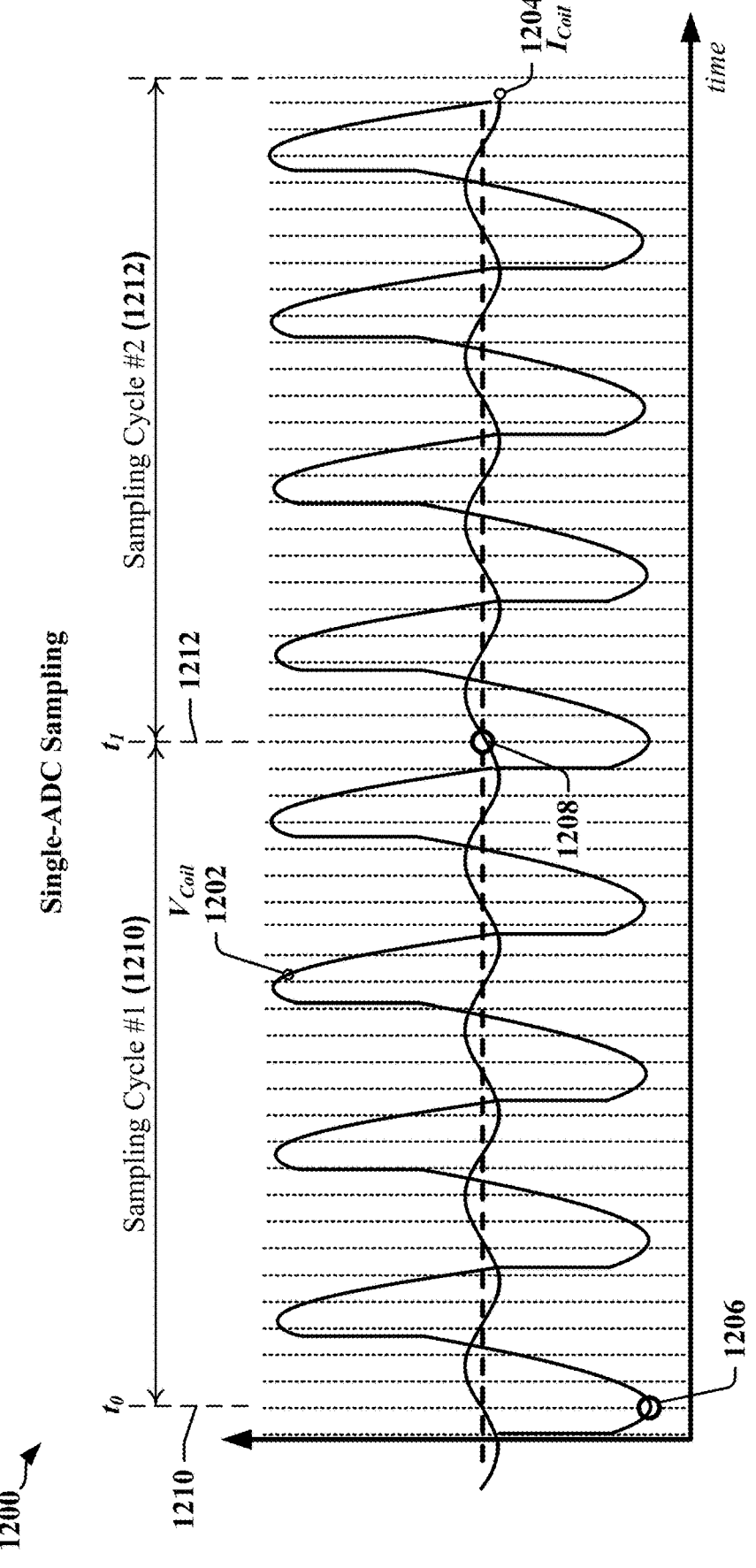
FIG. 12 illustrates an example of a sampling scheme using a single sampling device configured in accordance with certain aspects of this disclosure.

FIG. 12 illustrates an example of sampling strategy 1200 that may be employed in accordance with certain aspects disclosed herein when a single sampling device (e.g., an ADC) is available. In this example, sampling may be performed using the processing circuit 1102 of FIG. 11. A total of 50 sampling points is provided, with 25 sampling points allocated for sampling $V_{Coil}$ 1202 and 25 sampling points allocated for sampling $I_{Coil}$ 1204. In one example, for each sample 1206 of $V_{Coil}$ 1202 captured at a time within a first sampling cycle 1210, a sample 1208 of $I_{Coil}$ 1204 is captured at a corresponding time within a second sampling cycle 1212. It can be stated that samples are captured at specific phases of the sampling cycles 1210, 1212 and that when a sample 1206 of $V_{Coil}$ 1202 is captured at a specific phase of the first sampling cycle 1210, a sample 1208 of $I_{Coil}$ 1204 is captured at the specific phase in the second sampling cycle 1212. The phases of a sampling cycle 1210, 1212 correspond to mutually different phases of $V_{Coil}$ 1202 or $I_{Coil}$ 1204; that is, each sampled phase of $V_{Coil}$ 1202 or $I_{Coil}$ 1204 is sampled no more than once in each sampling cycle 1210, 1212.

Sampling frequency can be selected to enable the equivalent real-time positions in the $V_{Coil}$ 1202 and $I_{Coil}$ 1204 waveforms to be sampled in different sampling cycles 1210, 1212. In the illustrated example, a sample 1206 of $V_{Coil}$ 1202 is taken at a time 1210 t=$t_0$ and a sample 1208 of $I_{Coil}$ 1204 is taken at a time 1210 t=$t_1$, where $t_1$ occurs four clock cycles of $V_{coil}$ 1202 after $t_0$. In other words:

$$V_{Coil}(t_0) = V_{Coil}(t_1) \qquad \text{Equation 6}$$

and $$I_{Coil}(t_0) = I_{Coil}(t_1) \qquad \text{Equation 7}$$

This type of sampling can provide results that are the equivalent of results obtained by sampling voltage and current simultaneously.

In one example, a sampling frequency ($f_s$) selected to obtain 25 samples of each waveform over a period of eight voltage/current cycles may be calculated as:

$$f_s = f_{sw} \times N_{Samp}/N_{Cycles} = 25/4 \qquad \text{Equation 8}$$

It will be appreciated that other sampling frequencies may be employed and other sampling schemes can be used based on application requirements, available circuits and circuit capabilities. Samples can be taken in different sequences than those described herein. In some instances, interleaved sampling may be used such that samples are taken in alternate sampling points (e.g., one voltage sample followed by one current sample). In some instances, all voltage samples can be captured in one sampling cycle and all current samples can be captured in another sampling cycle.

According to certain aspects of this disclosure, a need for synchronous sampling to determine the power of a transmitting coil can be satisfied by sampling that is evenly distributed across a sampling cycle that includes two or more power switching cycles. A sampling scheme can be configured to characterize different parts of the current and voltage waveforms in order to enable accurate calculation of power. The sampling scheme may be configured by selecting a suitable sampling frequency. Current and voltage can be sampled simultaneously when a sufficient number of enough ADC modules are available. Current and voltage can be sampled sequentially using a single ADC module. In some examples, the sampling frequency can be adjusted, or a time delay can be added between sampling points when collecting voltage and current samples that correspond to the same repeated instant in time.

Referring again to Equation 3, the power transmitted by a charging device can be calculated from three terms. The first term uses both samples of voltage and current to find the total power that is provides to the transmitting coil. The second and third terms are losses attributable to losses in the transmitting coil and to effects of internal parasitic metal or magnetically permeable components. The loss terms are directly proportional to the root mean square (RMS) value of coil voltage and coil current. The RMS value of voltage and current can be calculated from collected samples as follows:

$$P_{tx} = \sqrt{1/N_{samp} \sum_{n=1}^{n=N_{Samp}} \left(I(n)_{Coil}^2\right)}$$ Equation 9

$$P_{tx} = \sqrt{1/N_{samp} \sum_{n=1}^{n=N_{Samp}} \left(V(n)_{Coil}^2\right)}$$ Equation 10

The wireless charging device may calculate the loss terms during a calibration process and may then determine that additional losses or new losses are attributable to the placement of a foreign object on or near a charging surface of the charging device. The wireless charging device may determine that reduced losses are attributable to the removal of a foreign object from the charging surface.

In some examples, the wireless charging device may accumulate a history of calculated power loss values for different wireless power transfers. The history may be used to establish a minimum power loss that can be used as a baseline value for determining whether a new calculated power loss value indicates the presence of a foreign object. In one example, the history may be used to establish one or more threshold power loss values used to indicate power loss values attributable to a foreign object. In some instances, the baseline value may be determined using statistical methods that can account for variations in manufacturing process, voltage and temperature (PVT) and other factors that can affect power losses over time. In some examples, the baseline value or threshold power loss values may be associated with quality of coupling between transmitter and receiver to account for coil alignment or spacing during wireless power transfer.

Example of a Processing Circuit

Figure 13:
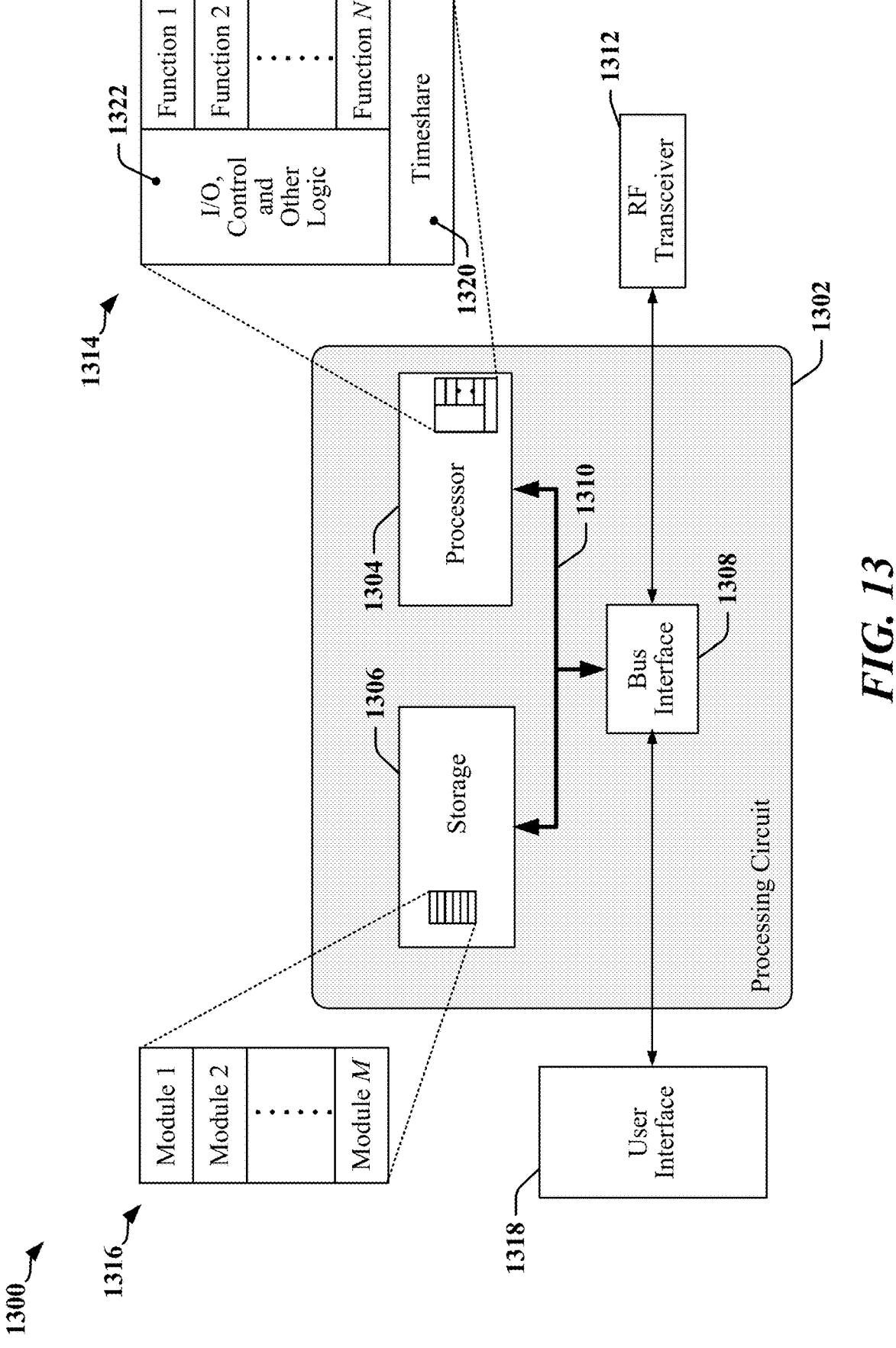
FIG. 13 illustrates one example of an apparatus employing a processing circuit that may be adapted according to certain aspects disclosed herein.

FIG. 13 illustrates an example of a hardware implementation for an apparatus 1300 that may be incorporated in a charging device or in a receiving device that enables a battery to be wirelessly charged. In some examples, the apparatus 1300 may perform one or more functions disclosed herein. In accordance with various aspects of the disclosure, an element, or any portion of an element, or any combination of elements as disclosed herein may be implemented using a processing circuit 1302. The processing circuit 1302 may include one or more processors 1304 that are controlled by some combination of hardware and software modules. Examples of processors 1304 include microprocessors, microcontrollers, DSPs, SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1304 may include specialized processors that perform specific functions, and that may be configured, augmented or controlled by one of the software modules 1316. The one or more processors 1304 may be configured through a combination of software modules 1316 loaded during initialization, and further configured by loading or unloading one or more software modules 1316 during operation.

In the illustrated example, the processing circuit 1302 may be implemented with a bus architecture, represented generally by the bus 1310. The bus 1310 may include any number of interconnecting buses and bridges depending on the specific application of the processing circuit 1302 and the overall design constraints. The bus 1310 links together various circuits including the one or more processors 1304, and storage 1306. Storage 1306 may include memory devices and mass storage devices, and may be referred to herein as computer-readable media and/or processor-readable media. The storage 1306 may include transitory storage media and/or non-transitory storage media.

The bus 1310 may also link various other circuits such as timing sources, timers, peripherals, voltage regulators, and power management circuits. A bus interface 1308 may provide an interface between the bus 1310 and one or more transceivers 1312. In one example, a transceiver 1312 may be provided to enable the apparatus 1300 to communicate with a charging or receiving device in accordance with a standards-defined protocol. Depending upon the nature of the apparatus 1300, a user interface 1318 (e.g., keypad, display, speaker, microphone, joystick) may also be provided, and may be communicatively coupled to the bus 1310 directly or through the bus interface 1308.

A processor 1304 may be responsible for managing the bus 1310 and for general processing that may include the execution of software stored in a computer-readable medium that may include the storage 1306. In this respect, the processing circuit 1302, including the processor 1304, may be used to implement any of the methods, functions and techniques disclosed herein. The storage 1306 may be used for storing data that is manipulated by the processor 1304 when executing software, and the software may be configured to implement any one of the methods disclosed herein.

One or more processors 1304 in the processing circuit 1302 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1306 or in an external computer-readable medium. The external computer-readable medium and/or storage 1306 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1306 may also include, by way of example, a carrier wave, a transmission line, and any other suitable medium for transmitting software and/or instructions that may be accessed and read by a computer. Computer-readable medium and/or the storage 1306 may reside in the processing circuit 1302, in the processor 1304, external to the processing circuit 1302, or be distributed across multiple entities including the processing circuit 1302. The computer-readable medium and/or storage 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1306 may maintain and/or organize software in loadable code segments, modules, applications, programs, etc., which may be referred to herein as software modules 1316. Each of the software modules 1316 may include instructions and data that, when installed or loaded on the processing circuit 1302 and executed by the one or more processors 1304, contribute to a run-time image 1314 that controls the operation of the one or more processors 1304. When executed, certain instructions may cause the processing circuit 1302 to perform functions in accordance with certain methods, algorithms and processes described herein.

Some of the software modules 1316 may be loaded during initialization of the processing circuit 1302, and these software modules 1316 may configure the processing circuit 1302 to enable performance of the various functions disclosed herein. For example, some software modules 1316 may configure internal devices and/or logic circuits 1322 of the processor 1304, and may manage access to external devices such as a transceiver 1312, the bus interface 1308, the user interface 1318, timers, mathematical coprocessors, and so on. The software modules 1316 may include a control program and/or an operating system that interacts with interrupt handlers and device drivers, and that controls access to various resources provided by the processing circuit 1302. The resources may include memory, processing time, access to a transceiver 1312, the user interface 1318, and so on.

One or more processors 1304 of the processing circuit 1302 may be multifunctional, whereby some of the software modules 1316 are loaded and configured to perform different functions or different instances of the same function. The one or more processors 1304 may additionally be adapted to manage background tasks initiated in response to inputs from the user interface 1318, the transceiver 1312, and device drivers, for example. To support the performance of multiple functions, the one or more processors 1304 may be configured to provide a multitasking environment, whereby each of a plurality of functions is implemented as a set of tasks serviced by the one or more processors 1304 as needed or desired. In one example, the multitasking environment may be implemented using a timesharing program 1320 that passes control of a processor 1304 between different tasks, whereby each task returns control of the one or more processors 1304 to the timesharing program 1320 upon completion of any outstanding operations and/or in response to an input such as an interrupt. When a task has control of the one or more processors 1304, the processing circuit is effectively specialized for the purposes addressed by the function associated with the controlling task. The timesharing program 1320 may include an operating system, a main loop that transfers control on a round-robin basis, a function that allocates control of the one or more processors 1304 in accordance with a prioritization of the functions, and/or an interrupt driven main loop that responds to external events by providing control of the one or more processors 1304 to a handling function.

In one implementation, the apparatus 1300 includes or operates as a wireless charging device that has a battery charging power source coupled to a charging circuit, a plurality of charging cells and a controller, which may be included in one or more processors 1304. The plurality of charging cells may be configured to provide a charging surface. At least one coil may be configured to direct an electromagnetic field through a charge transfer area of each charging cell.

The wireless charging device may have a resonant circuit comprising one or more power transmitting coils in a charging surface of the charging device, a driver circuit configured to provide a charging current to the resonant circuit, and a controller. The controller may be configured to determine an average transmitted power using samples of current and voltage captured from the resonant circuit, and determine that a foreign object is located on or near the charging surface when the average transmitted power exceeds a measurement of received power provided by a receiving device and parasitic losses associated with the wireless charging device. In some instances, the parasitic losses are attributable to metallic or magnetically permeable components of the wireless charging device. In one example, each sample of current is obtained by measuring a current flowing in the resonant circuit, and each of sample of voltage is obtained by measuring a voltage across the one or more power transmitting coils.

In certain examples, the charging device includes one or more ADC configured to capture the samples of current and voltage based on one or more sampling cycles having a period that spans a plurality of periods of a cycle of the charging current. Each sampling cycle may include or define a plurality of sampling points. In one example, each of the plurality of sampling points occurs at a different phase of the cycle of the charging current than each of the other samples in the plurality of sampling points. The one or more ADCs comprise a single ADC configured to capture a first sample of current at a first sampling point in a first sampling cycle, and capture a first sample of voltage at a corresponding first sampling point in the second sampling cycle. In another example, a first ADC is configured to capture a first sample of current at a first sampling point in a first sampling cycle, and a second ADC is configured to capture a first sample of voltage at the first sampling point in the first sampling cycle.

In certain examples, the charging device includes a clock generating circuit configured to divide a root clock by a first integer to obtain a sampling clock having a sampling clock frequency that determines frequency of a sampling cycle in which the samples of current and voltage captured from the resonant circuit, and divide the root clock by a second integer to obtain a charging clock having that controls frequency of the charging current. In this example, the first integer and the second integer have a largest common divisor of 1.

In some implementations, the storage 1306 maintains instructions and information where the instructions are configured to cause the one or more processors 1304 to cause a charging current to be provided to a resonant circuit that includes one or more power transmitting coils in a charging surface of a wireless charging device, determine an average transmitted power using samples of current and voltage captured from the resonant circuit, and determine that a foreign object is located on or near the charging surface when the average transmitted power exceeds a measurement of received power provided by a receiving device and parasitic losses associated with the wireless charging device.

In one example the instructions cause the processor to capture the samples of current and voltage in a first sampling cycle and a second sampling cycle, each sampling cycle having a period that spans a plurality of periods of a cycle of the charging current. Each sampling cycle may include a plurality of sampling points occurring at mutually different phases of the cycle of the charging current. A first sample of current may be captured at the first sampling point and a first sample of voltage is captured at a corresponding first sampling point in the second sampling cycle.

In another example the instructions cause the processor to capture the samples of current and voltage in a single sampling cycle that has a period spanning a plurality of periods of a cycle of the charging current. Each sampling cycle in this example includes a plurality of sampling points occurring at mutually different phases of the cycle of the charging current, and samples of current and voltage are captured simultaneously at each sampling point in the plurality of sampling points in a single sampling cycle.

FIG. 14 is a flowchart 1400 illustrating a method for operating a charging device in accordance with certain aspects of this disclosure. The method may be performed by a DSP, processor or other controller in the charging device. At block 1402, a charging current may be provided to a resonant circuit that includes one or more power transmitting coils in a charging surface of a wireless charging device. At block 1404, an average transmitted power may be determined using samples of current and voltage captured from the resonant circuit. At block 1406, a foreign object may be determined to be located on or near the charging surface when the average transmitted power exceeds a measurement of received power provided by a receiving device and parasitic losses associated with the wireless charging device. In some instances, the parasitic losses are attributable to metallic or magnetically permeable components of the wireless charging device. In one example, each sample of current is obtained by measuring a current flowing in the resonant circuit, and each of sample of voltage is obtained by measuring a voltage across the one or more power transmitting coils.

In certain examples, the samples of current and voltage are captured in one or more sampling cycles having a period that spans a plurality of periods of a cycle of the charging current. Each sampling cycle may include a plurality of sampling points. In one example, each of the plurality of sampling points occurs at a different phase of the cycle of the charging current than each of the other samples in the plurality of sampling points. The one or more sampling cycles may include a first sampling cycle and a second sampling cycle. A first sample of current may be captured at a first sampling point in the first sampling cycle, and a first sample of voltage is captured at a corresponding first sampling point in the second sampling cycle. In another example, samples of current and voltage are captured simultaneously at each sampling point in the plurality of sampling points in a single sampling cycle.

In some examples, a root clock signal having a root clock frequency is provided to a clock generation circuit. The clock generation circuit may divide the root clock by a first integer to obtain a sampling clock having a sampling clock frequency that determines frequency of a sampling cycle in which the samples of current and voltage captured from the resonant circuit. The clock generation circuit may divide the root clock by a second integer to obtain a charging clock having that controls frequency of the charging current. The first integer and the second integer may have a largest common divisor of 1.

Some implementation examples are described in the following numbered clauses:

1. A method for operating a wireless charging device, comprising: providing a charging current to a resonant circuit that includes one or more power transmitting coils in a charging surface of a wireless charging device; determining an average transmitted power using samples of current and voltage captured from the resonant circuit; and determining that a foreign object is located on or near the charging surface when the average transmitted power exceeds a measurement of received power provided by a receiving device and parasitic losses associated with the wireless charging device.

2. The method as described in clause 1, wherein each sample of current is obtained by measuring a current flowing in the resonant circuit, and each of sample of voltage is obtained by measuring a voltage across the one or more power transmitting coils.

3. The method as described in clause 1 or clause 2, further comprising: capturing the samples of current and voltage in one or more sampling cycles having a period that spans a plurality of periods of a cycle of the charging current, wherein each sampling cycle includes a plurality of sampling points.

4. The method as described in clause 3, wherein each of the plurality of sampling points occurs at a different phase of the cycle of the charging current than each of the other samples in the plurality of sampling points.

5. The method as described in clause 4, wherein the one or more sampling cycles includes a first sampling cycle and a second sampling cycle, wherein a first sample of current is captured at a first sampling point in the first sampling cycle, and wherein a first sample of voltage is captured at a corresponding first sampling point in the second sampling cycle.

6. The method as described in clause 3, wherein samples of current and voltage are captured simultaneously at each sampling point in the plurality of sampling points in a single sampling cycle.

7. The method as described in any of clauses 1-6, further comprising: providing a root clock signal having a root clock frequency; dividing the root clock frequency by a first integer to obtain a sampling clock frequency that determines frequency of a sampling cycle in which the samples of current and voltage captured from the resonant circuit; and dividing the root clock signal by a second integer to obtain a charging clock frequency that controls frequency of the charging current, wherein the first integer and the second integer have a largest common divisor of 1.

8. The method as described in any of clauses 1-7, wherein the parasitic losses are attributable to metallic or magnetically permeable components of the wireless charging device.

9. A charging device, comprising: a resonant circuit comprising one or more power transmitting coils in a charging surface of the charging device; a driver circuit configured to provide a charging current to the resonant circuit; and a controller configured to: determine an average transmitted power using samples of current and voltage captured from the resonant circuit; and determine that a foreign object is located on or near the charging surface when the average transmitted power exceeds a measurement of received power provided by a receiving device and parasitic losses associated with the wireless charging device.

10. The charging device as described in clause 9, wherein each sample of current is obtained by measuring a current flowing in the resonant circuit, and each of sample of voltage is obtained by measuring a voltage across the one or more power transmitting coils.

11. The charging device as described in clause 9 or clause 10, further comprising one or more analog-to-digital converters (ADC) configured to: capture the samples of current and voltage based on one or more sampling cycles having a period that spans a plurality of periods of a cycle of the charging current, wherein each sampling cycle includes a plurality of sampling points.

12. The charging device as described in clause 11, wherein each of the plurality of sampling points occurs at a different phase of the cycle of the charging current than each of the other samples in the plurality of sampling points.

13. The charging device as described in clause 12, wherein the one or more ADCs comprise a single ADC configured to: capture a first sample of current at a first sampling point in a first sampling cycle; and capture a first sample of voltage at a corresponding first sampling point in a second sampling cycle.

14. The charging device as described in clause 11, wherein the one or more ADCs comprise: a first ADC configured to capture a first sample of current at a first sampling point in a first sampling cycle; and a second ADC configured to capture a first sample of voltage at the first sampling point in the first sampling cycle.

15. The charging device as described in any of clauses 9-14, further comprising a clock generating circuit configured to: divide a root clock frequency by a first integer to obtain a sampling clock frequency that determines frequency of a sampling cycle in which the samples of current and voltage captured from the resonant circuit; and divide the root clock frequency by a second integer to obtain a charging clock frequency that controls frequency of the charging current, wherein the first integer and the second integer have a largest common divisor of 1.

16. The charging device as described in any of clauses 9-15, wherein the parasitic losses are attributable to metallic or magnetically permeable components of the wireless charging device.

17. A processor-readable storage medium having instructions stored thereon which, when executed by at least one processor in a charging device, cause the processor to: cause a charging current to be provided to a resonant circuit that includes one or more power transmitting coils in a charging surface of a wireless charging device; determine an average transmitted power using samples of current and voltage captured from the resonant circuit; and determine that a foreign object is located on or near the charging surface when the average transmitted power exceeds a measurement of received power provided by a receiving device and parasitic losses associated with the wireless charging device.

18. The processor-readable storage medium as described in clause 19, wherein the instructions cause the processor to: capture the samples of current and voltage in a first sampling cycle and a second sampling cycle, each sampling cycle having a period that spans a plurality of periods of a cycle of the charging current, wherein each sampling cycle includes a plurality of sampling points occurring at mutually different phases of the cycle of the charging current, and wherein a first sample of current is captured at the first sampling point and a first sample of voltage is captured at a corresponding first sampling point in the second sampling cycle.

19. The processor-readable storage medium as described in clause 19, wherein the instructions cause the processor to: capture the samples of current and voltage in a single sampling cycle that has a period spanning a plurality of periods of a cycle of the charging current, wherein each sampling cycle includes a plurality of sampling points occurring at mutually different phases of the cycle of the charging current, and wherein samples of current and voltage are captured simultaneously at each sampling point in the plurality of sampling points in a single sampling cycle.

20. The processor-readable storage medium as described in clause 19, wherein the instructions cause the processor to: divide a root clock frequency by a first integer to obtain a sampling clock frequency that determines frequency of a sampling cycle in which the samples of current and voltage captured from the resonant circuit; and divide the root clock frequency by a second integer to obtain a charging clock frequency that controls frequency of the charging current, wherein the first integer and the second integer have a largest common divisor of 1.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for operating a wireless charging device, comprising:
    providing a charging current to a resonant circuit that includes one or more power transmitting coils in a charging surface of a wireless charging device;
    determining an average transmitted power using samples of current and voltage captured from the resonant circuit;
    determining that a foreign object is located on or near the charging surface when the average transmitted power exceeds a measurement of received power provided by a receiving device and parasitic losses associated with the wireless charging device; and
    capturing the samples of current and voltage in one or more sampling cycles having a period that spans a plurality of periods of a cycle of the charging current, wherein each sampling cycle includes a plurality of sampling points, wherein each of the plurality of sampling points occurs at a different phase of the cycle of the charging current than each of the other samples in the plurality of sampling points, wherein the one or more sampling cycles includes a first sampling cycle and a second sampling cycle, wherein a first sample of current is captured at a first sampling point in the first sampling cycle, and wherein a first sample of voltage is captured at a corresponding first sampling point in the second sampling cycle.

2. The method of claim 1, wherein each sample of current is obtained by measuring a current flowing in the resonant circuit, and each of sample of voltage is obtained by measuring a voltage across the one or more power transmitting coils.

3. The method of claim 1, wherein samples of current and voltage are captured simultaneously at each sampling point in the plurality of sampling points in a single sampling cycle.

4. A method for operating a wireless charging device, comprising:

providing a charging current to a resonant circuit that includes one or more power transmitting coils in a charging surface of a wireless charging device;

determining an average transmitted power using samples of current and voltage captured from the resonant circuit;

determining that a foreign object is located on or near the charging surface when the average transmitted power exceeds a measurement of received power provided by a receiving device and parasitic losses associated with the wireless charging device;

providing a root clock signal having a root clock frequency;

dividing the root clock frequency by a first integer to obtain a sampling clock frequency that determines frequency of a sampling cycle in which the samples of current and voltage captured from the resonant circuit; and dividing the root clock signal by a second integer to obtain a charging clock frequency that controls frequency of the charging current, wherein the first integer and the second integer have a largest common divisor of 1.

5. The method of claim 1, wherein the parasitic losses are attributable to metallic or magnetically permeable components of the wireless charging device.

6. A charging device, comprising:

a resonant circuit comprising one or more power transmitting coils in a charging surface of the charging device;

a driver circuit configured to provide a charging current to the resonant circuit; and a controller configured to:

determine an average transmitted power using samples of current and voltage captured from the resonant circuit; and determine that a foreign object is located on or near the charging surface when the average transmitted power exceeds a measurement of received power provided by a receiving device and parasitic losses associated with the charging device; and one or more analog-to-digital converters (ADC) configured to capture the samples of current and voltage based on one or more sampling cycles having a period that spans a plurality of periods of a cycle of the charging current, wherein each sampling cycle includes a plurality of sampling points, wherein each of the plurality of sampling points occurs at a different phase of the cycle of the charging current than each of the other samples in the plurality of sampling points, and wherein the one or more ADCs comprise a single ADC configured to:

capture a first sample of current at a first sampling point in a first sampling cycle; and capture a first sample of voltage at a corresponding first sampling point in a second sampling cycle.

7. The charging device of claim 6, wherein each sample of current is obtained by measuring a current flowing in the resonant circuit, and each of sample of voltage is obtained by measuring a voltage across the one or more power transmitting coils.

8. The charging device of claim 6, wherein the one or more ADCs comprise:

a first ADC configured to capture a first sample of current at a first sampling point in a first sampling cycle; and a second ADC configured to capture a first sample of voltage at the first sampling point in the first sampling cycle.

9. A charging device comprising:

a resonant circuit comprising one or more power transmitting coils in a charging surface of the charging device;

a driver circuit configured to provide a charging current to the resonant circuit; and a controller configured to:

determine an average transmitted power using samples of current and voltage captured from the resonant circuit; and determine that a foreign object is located on or near the charging surface when the average transmitted power exceeds a measurement of received power provided by a receiving device and parasitic losses associated with the charging; and a clock generating circuit configured to:

divide a root clock frequency by a first integer to obtain a sampling clock frequency that determines frequency of a sampling cycle in which the samples of current and voltage captured from the resonant circuit; and divide the root clock frequency by a second integer to obtain a charging clock frequency that controls frequency of the charging current, wherein the first integer and the second integer have a largest common divisor of 1.

10. The charging device of claim 6, wherein the parasitic losses are attributable to metallic or magnetically permeable components of the charging device.

11. A non-transitory processor-readable storage medium having instructions stored thereon which, when executed by at least one processor in a charging device, cause the processor to:

cause a charging current to be provided to a resonant circuit that includes one or more power transmitting coils in a charging surface of a wireless charging device;

determine an average transmitted power using samples of current and voltage captured from the resonant circuit;

determine that a foreign object is located on or near the charging surface when the average transmitted power exceeds a measurement of received power provided by a receiving device and parasitic losses associated with the wireless charging device; and capture the samples of current and voltage in a first sampling cycle and a second sampling cycle, each sampling cycle having a period that spans a plurality of periods of a cycle of the charging current, wherein each sampling cycle includes a plurality of sampling points occurring at mutually different phases of the cycle of the charging current, and wherein a first sample of current is captured at the first sampling point and a first sample of voltage is captured at a corresponding first sampling point in the second sampling cycle.

12. The non-transitory processor-readable storage medium of claim 11, wherein the instructions cause the processor to:

capture the samples of current and voltage in a single sampling cycle that has a period spanning a plurality of periods of a cycle of the charging current, wherein each sampling cycle includes a plurality of sampling points occurring at mutually different phases of the cycle of the charging current, and wherein samples of current and voltage are captured simultaneously at each sampling point in the plurality of sampling points in a single sampling cycle.

13. The non-transitory processor-readable storage medium of claim 11, wherein the instructions cause the processor to:

divide a root clock frequency by a first integer to obtain a sampling clock frequency that determines frequency of a sampling cycle in which the samples of current and voltage captured from the resonant circuit; and divide the root clock frequency by a second integer to obtain a charging clock frequency that controls frequency of the charging current, wherein the first integer and the second integer have a largest common divisor of 1.

* * * * *